US006999765B2

(12) United States Patent
Hokao (10) Patent No.: US 6,999,765 B2
(45) Date of Patent: Feb. 14, 2006

(54) CDMA TYPE MOBILE STATION HAVING FIRST AND SECOND RECEIVING PORTIONS FOR ROUNDING OFF A CHIP OFFSET TEMPORALLY EARLY AND LATE

(75) Inventor: Tomoaki Hokao, Tokyo (JP)

(73) Assignee: NEC Corporation, Tokyo (JP)

( * ) Notice: Subject to any disclaimer, the term of this patent is extended or adjusted under 35 U.S.C. 154(b) by 253 days.

(21) Appl. No.: 10/665,276

(22) Filed: Sep. 22, 2003

(65) Prior Publication Data

US 2004/0057396 A1 Mar. 25, 2004

(30) Foreign Application Priority Data

Sep. 20, 2002 (JP) .............................. 2002-275049

(51) Int. Cl.
*H04Q 7/20* (2006.01)
(52) U.S. Cl. ...................... 455/436; 455/439; 455/464; 370/342; 370/441; 370/331; 375/147
(58) Field of Classification Search ................ 455/436, 455/439, 464; 370/342, 441, 331; 375/147, 375/136
See application file for complete search history.

(56) References Cited

U.S. PATENT DOCUMENTS

| 5,345,448 A | | 9/1994 | Keskitalo | |
|---|---|---|---|---|
| 6,078,572 A | * | 6/2000 | Tanno et al. | ................ 370/335 |
| 6,580,749 B1 | * | 6/2003 | Miura | ........................ 375/147 |

| 2001/0038663 A1 | | 11/2001 | Medlock | |
|---|---|---|---|---|
| 2005/0096077 A1 | * | 5/2005 | Moon | ......................... 455/522 |
| 2005/0163068 A1 | * | 7/2005 | Saifuddin | .................... 370/326 |

FOREIGN PATENT DOCUMENTS

| JP | 2947279 | 2/2000 |
|---|---|---|
| JP | 2001-054162 | 2/2001 |
| JP | 2001-211471 | 8/2001 |
| JP | 2002-152791 | 5/2002 |
| WO | PCT WO 00/70792 | 11/2000 |
| WO | PCT WO 02/058280 A1 | 7/2002 |

OTHER PUBLICATIONS

European Search Report dated Jan. 13, 2004.
"3rd Generation Partnership Project: Technical Specification Group Radio Access Network; Synchronisation in UTRAN Stage 2", 3GPP TS 25.402 V5.1.0, Jun. 2002, pp. 1-46, XP002261398.

* cited by examiner

*Primary Examiner*—Sonny Trinh
*Assistant Examiner*—Phuoc Doan
(74) *Attorney, Agent, or Firm*—McGinn IP Law Group, PLLC (57) ABSTRACT

A mobile station (MS) has a radio portion (12), a combining portion (15), a data processing portion (16), and a control portion (18). The mobile station (MS) further has a first receiving portion (13), a second receiving portion (14) between the radio portion (12) and the combining portion (15), and a transmitting portion (15). The first receiving portion (13) temporally early rounds a chip offset off while the second receiving portion (14) temporally late rounds the chip offset off.

6 Claims, 8 Drawing Sheets

CDMA TYPE MOBILE STATION HAVING FIRST AND SECOND RECEIVING PORTIONS FOR ROUNDING OFF A CHIP OFFSET TEMPORALLY EARLY AND LATE

This application claims priority to application JP 2002-275049, the disclosure of which is incorporated herein by reference.

BACKGROUND OF THE INVENTION

This invention relates to a mobile station or a mobile communication terminal and, in particularly, to a mobile station for use in a code division multiple access (CDMA) communication system which simultaneously carries out a plurality of communications using signals having the same frequency band by means of spread spectrum technique.

As a cellular mobile radio communication system, a wide variety of multiple access systems have been heretofore proposed and be adopted in the world. Among others, a recent tendency has been directed to a cellular mobile radio code division multiple access (CDMA) communication system which has a specific spreading code assigned to each channel and which will be simply called a CDMA communication system. In such a CDMA communication system, a modulated wave of an identical carrier frequency which is spread by each specific spreading code is transmitted as a radio signal from a transmitter side to a receiver side. Responsive to the radio signal, a CDMA receiver in the receiver side carries out synchronization operation by the use of each specific spreading code to identify a desired channel. In order to distinguish the channels from one another, different spreading codes are used to identify radio channels between the base station and the mobile stations.

In addition, the radio signal is received through a plurality of paths, namely, a multipath in the CDMA communication system and, therefore, multipath fading should be removed from the radio signal in the CDMA communication system by accurately detecting a predetermined signal such as a synchronization signal and/or a pilot signal.

Furthermore, it is to be considered in the cellular mobile radio communication system that each mobile station is moved in radio service areas or cells from one to another with communication kept between each mobile station and base stations. In this event, the base stations must be switched from one to another without interrupting communication with the mobile station.

Mobile communication terminals have become into use because of convenience. The mobile communication terminals generally introduce the above-mentioned CDMA communication system.

Various mobile communication terminals are already known. By way of example, Japanese Unexamined Patent Publication of Tokkai No. 2001-54,162 or JP-A 2001-54162 discloses "TERMINAL FOR MOBILE COMMUNICATION" to minimize a delay buffer to adjust deviation in reception timing of a signal sent from a plurality of base stations in the case of conducting hand-over through site diversity reception with respect to a terminal for mobile communication. According to JP-A 2001-54162, a $T_{DHO}$ calculation section measures a time difference between a transmission timing of a communication channel with a hand-over source base station and a reception timing of a perch channel of a hand-over destination. A $T_{last}$ decision section decides a lowest reception timing on the basis of an adjustment value of a delay buffer that adjusts a deviation from reception timings of communication channels from each base station in a site diversity state. A CPU reports a value closer to a slowest retiming $T_{last}$ among received signals from each base station in the above time difference TDHO and a value to/from which a round unit by one symbol is added/subtracted as time difference information of the reception timing of the peach channel.

Japanese Granted Patent Publication of Tokkyo No. 2,947,279 or JP-B 2947279, which corresponds to EP0977378, discloses "Spread spectrum communication system and handover method therein." According to JP-B 2947279, a spread spectrum communication system comprises at least one mobile station and a plurality of base stations for communicating with mobile stations in sites thereof by a spread spectrum scheme. Each of the base stations includes accumulation means for accumulating a reception timing difference indicating a difference in reception timing between a transmission signal a mobile station in a base station in an adjacent site and a transmission signal from the mobile station in a self-station, and calculation means for obtaining a reception timing of the transmission signal from the mobile station in the self-station by using reception timing difference between the self-station and a handover source base station in an adjacent site, which is accumulated in the accumulation means, when the self-station become a handover destination base station upon handover of the mobile station between adjacent sites.

Japanese Unexamined Patent Publication of Tokkai No. 2002-152,791 or JP-A 2002-152791 discloses "PHS(R) HANDING-OVER METHOD AND PHS(R) TERMINAL DEVICE" to shorten call interruption time attendant on handing-over. According to JP-A 2002-152791, when a PHS(R) terminal is to switch a radio zone, by selecting the radio base station of best conditions out of access timing synchronously secured by much more radio base stations, an environment in which a large number of other radio base stations securing synchronism exist is selected. Further, when the quality of communication with one radio base station is deteriorated in such a satisfactory environment, a communication line with the next radio base station is set while securing a communication line with this radio base station.

U.S. Pat. No. 5,345,448 issued to Keskitalo, Ilkka, which corresponds to EP0568212, discloses "Procedure for the handover a radio connection." According to Keskitalo, in a digital Time Division Multiple Access radio communications network that includes a number of Base Transceiver Stations, and several Mobile Stations, a handover can be accomplished so that the parameters required in identifying a Mobile Station, and the frequency data, the data of the time interval to be used, as well as the frame number data of the channel are given to a new Base Transceiver Station to which a Mobile Station will be moved. The new Base Transceiver Station is tuned to listen to the channel determined by the data it received. The former Base Station transmits a handover command to the Mobile Station containing the frequency data, the data of the time interval to be used, as well as the frame number data of the channel to which the new Base Station has moved. After the command the Mobile Station turns the trafficing directly to said channel. The timing measurements between the Base Station and the Mobile Station are not required and any tuning correction is carried out by the channel equalizer.

Japanese Unexamined Patent Publication of Tokkai No. 2001-211,471 or JP-A 2001-211471 discloses "PACKET EXCHANGE REMOTE MOBILE RADIO COMMUNICATION SYSTEM USING MORE EFFICIENT HARD HANDOVER" to improve communication quality by providing a hard succession configuration in which the interruption of connection to a mobile object is small/short regarding a general mobile telephone system (UMTS) operating on the basis of a packet exchange theory, an overall system (GSM) for mobile communication or the other remote mobile radio communication system. According to JP-A 2001-211471, in this packet exchange remote mobile radio communication system such as the UMTS or the GSM, a target RNC requests a direct link to an operating controller for in hard handover about a mobile object, the controller transmits an uplink frame from the mobile object to both a TRNC and a core network, the network transmits a downlink frame to the TRNC. The TRNC decides the time when the hanover is completed and reconstructs a frame when necessary.

In a conventional CDMA type mobile station, it may be impossible to nonnally carry out communication using a dedicated physical channel because chip offsets have different values between a radio base station and the mobile station in the manner which will later be described in conjunction with FIGS. 4A through 4C.

SUMMARY OF THE INVENTION

It is an object of this invention to provide a CDMA type mobile station which is capable of obstructing inability of communication caused by the above-mentioned chip offset.

Other objects of this invention will become clear as the description proceeds.

According to an aspect of this invention, a code division multiple access (CDMA) type mobile station comprises a radio portion for modulating a radio signal to produce a received signal and for demodulating a transmission signal into said radio signal, a receiving portion for despreading the received signal to produce received data, a transmitting portion for spreading transmission data to produce the transmission signal, a data processing portion for processing the received data and the transmission data, and a control portion for controlling operation of the radio portion, the receiving portion, the transmitting portion, and the data processing portion. The receiving portion comprises a first receiving portion for receiving the received signal at a first chip offset to which a chip offset is temporally early rounded off to produce a first received data symbol and a second receiving portion for receiving the received signal at a second chip offset to which the chip offset is temporally late rounded off to produce a second received data symbol. The CDMA type mobile station further comprises a combining portion, disposed between the receiving portion and the data processing portion, for combining the first received data symbol with the second data symbol to supply a combined data symbol to the data processing portion.

According to another aspect of this invention, a hard-handover method of a mobile station in a code division multiple access (CDMA) communication system, comprising the steps of calculating a reception timing of a handover destination on the basis of a timing difference between a primary common control channel sent from a first radio base station of a handover source and a primary common control channel sent from a second radio base station of the handover destination, of rounding the reception timing of the handover destination off to first and second reception timings, the first reception timing being earlier than the second reception timing, of simultaneously carrying out date reception of a received signal using the first and the second reception timings to produce first and second received data, of carrying out correlation decision of the first and the second received data to produce first and second correlation values, and of receiving the received signal using a selected one of the first and the second reception timings that has a larger one of the first and the second correlation values.

DESCRIPTION OF THE PREFERRED EMBODIMENT

Figure 1:
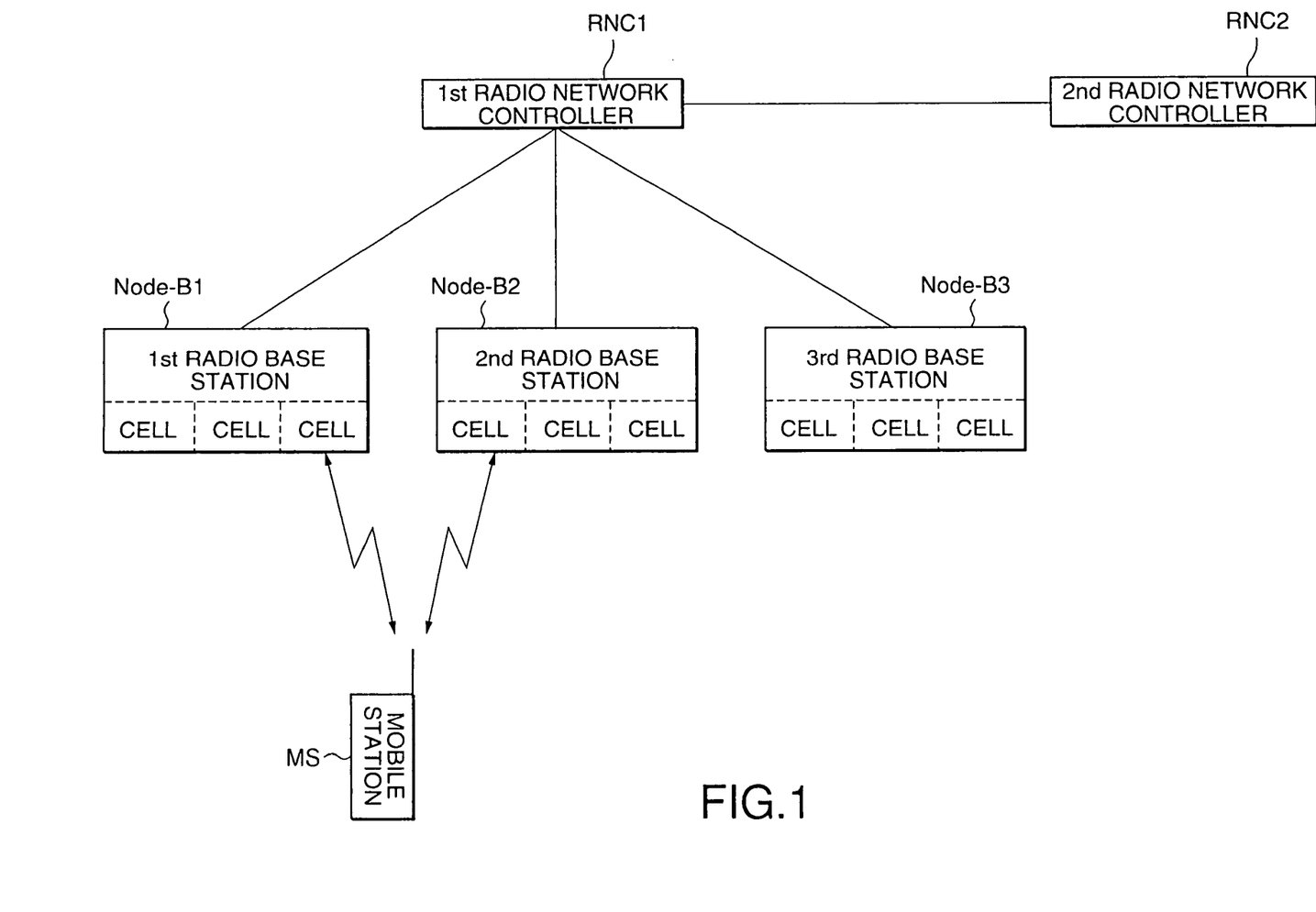
FIG. 1 shows a block diagram of a CDMA communication system to which a CDMA type mobile station according to an embodiment of this invention is applicable.

Referring to FIG. 1, the description will proceed to a CDMA communication system to which the present invention is applicable. The illustrated CDMA communication system comprises first and second radio network controllers RNC1 and RNC2, first through third radio base stations Node-B1, Node-B2, and Node-B3, and a mobile station MS. In the example being illustrated, the first and the second radio network controllers RNC1 and RNC2 are connected to each other. The first through the third radio base stations Node-B1 to Node-B3 are connected to the first radio network controller RNC1. Each of the first through the third radio base stations Node-B1 to Node-B3 has a plurality of cells.

As shown in FIG. 1, the first radio base station Node-B1 transmits/receives a radio signal to/from the mobile station MS while the second radio base station Node-B2 transmits/receives a radio signal to/from the mobile station MS. In the example being illustrated, the first radio base station Node-B1 is a radio base station during communication (before a hard-handover) while the second radio base station Node-B2 is a radio base station of a hard-handover destination (before the hard-handover). At any rate, the mobile station MS is put into a handover state between a cell of the first radio base stations Node-B1 and a cell of the second radio base station Node-B2. The mobile station MS is called a CDMA type mobile station.

In the CDMA type mobile station, a chip offset is defined as a reception timing on communication.

Figure 2A:
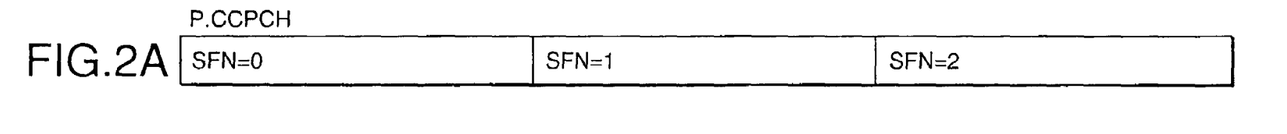
FIGS. 2A and 2B are views for use in describing a chip offset in a general CDMA type mobile station.
Figure 2B:
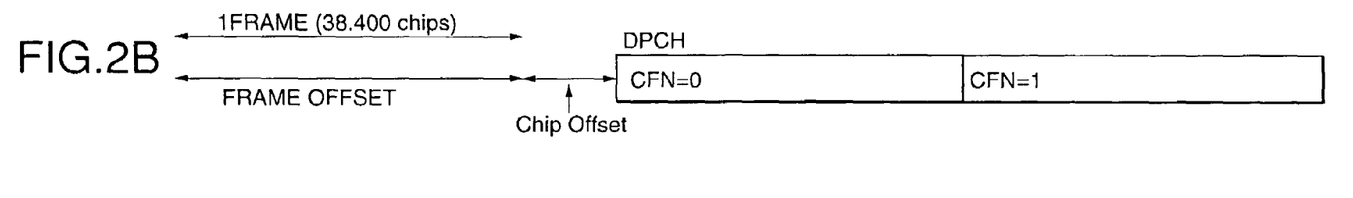

Referring to FIGS. 2A and 2B, the description will proceed to the chip offset. FIG. 2A shows system frame numbers SFN0, SFN1, and SFN1 of a primary common control channel PCCPCH. FIG. 2B shows connection frame numbers CFN0 and CFN1 of a dedicated physical channel DPCH. The primary common control channel PCCPCH is transmitted in the cells in common while the dedicated physical channel DPCH is used in a communication peculiar to a user. In FIGS. 2A and 2B, a timing time difference between the primary common control channel PCCPCH and the dedicated physical channel DPCH is represented by a unit of chip. One chip is equal to about 260 nanoseconds. The chip offset has a discrete value of a unit of 256 chips in order to guarantee orthogonality among the channels of the CDAM.

In communication, it is necessary to set the chip offset having the same value between the mobile station MS and each radio base station Node-B. However, the chip offset may shift between the radio base station Node-B and the mobile station MS in an actual communication. In this event, the communication is cut off. For example, there is a case of an inter-frequency hard-handover (which is called HHO) as follows.

The inter-frequency HHO is classified into two types, namely, a timing re-initialized HHO and a timing maintained HHO. In the timing re-initialized HHO, a transmission/reception timing of the mobile station MS is changed before and after a frequency changing. Therefore, the mobile station MS resets the transmission/reception timing after the frequency changing and carries out communication. In the timing maintained HHO, the transmission/reception timing of the mobile station MS before and after the frequency changing is basically maintained. Therefore, notification of the transmission/reception timing from a network to the mobile station MS is not carried out.

Figure 3A:
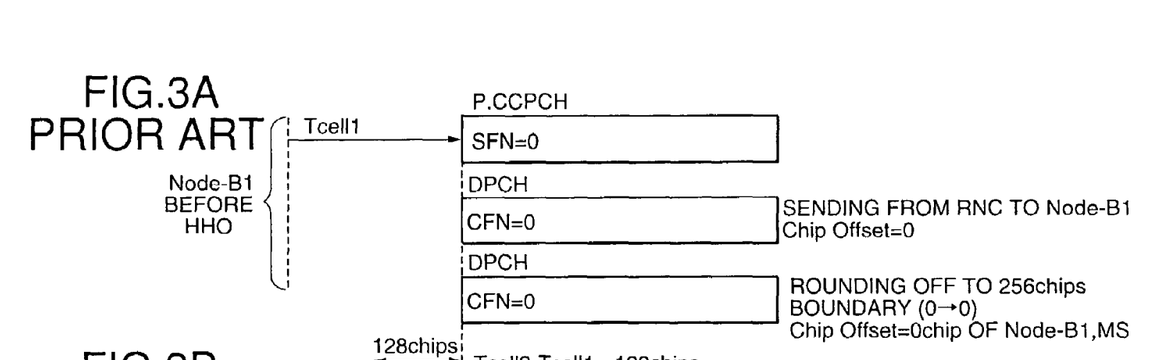
FIGS. 3A, 3B, and 3C are views for use in describing a successful example of a timing maintained hard-handover in the CDMA type mobile station.
Figure 3B:
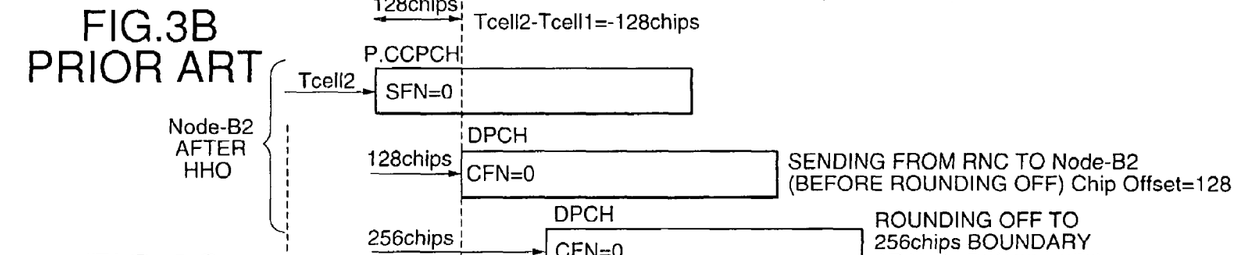
Figure 3C:
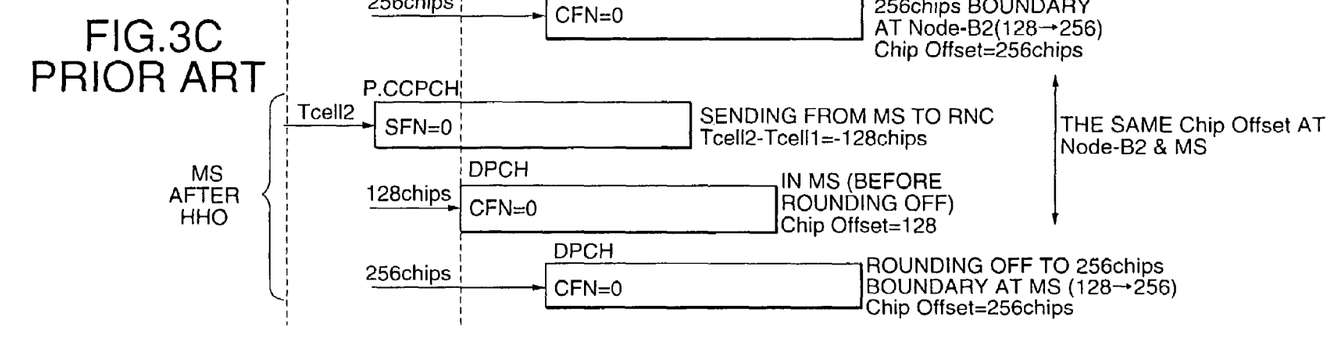

Referring to FIGS. 3A, 3B, and 3C, the description will proceed to a successful example of the timing maintained HHO. FIG. 3A shows a state of the first radio base station Node-B1 before the HHO. FIG. 3B shows a state of the second radio base station Node-B2 after the HHO. FIG. 3C shows a state of the mobile station MS after the HHO. In the HHO, a reception timing of the mobile station MS is strictly changed before and after the frequency changing. A transmission timing of the mobile station MS is maintained. In a wideband-CDMA type mobile communication, different radio base stations Node-B1 and Node-B2 a synchronously operate to each other. Therefore, when the timing maintained HHO is carried out between the different radio base stations Node-B1 and Node-B2, it is necessary for the mobile station MS to absorb a shift of the timing between the different radio base stations Node-B1 and Node-B2.

In FIGS. 3A through 3C, the radio network controller RNC is an apparatus for carrying out communication with the mobile station MS via the radio base station Node-B and for controlling the transmission/reception timings of the radio base station Node-B or the like. In the inter-frequency HHO, the mobile station MS measures a frame timing difference (Tcell2–Tcell2) between the primary common control channel PCCPCH sent from the first radio base station Node-B1 during communication (before HHO) and the primary common control channel PCCPCH sent from the second radio base station Node-B2 of HHO destination (after HHO) and sends the measured frame timing difference (Tcell2–Tcell1) to the first radio network controller RNC1. On the basis of the measured frame timing difference (Tcell2–Tcell1), the first radio network controller RNC1 calculates a chip offset for the HHO destination and sends the calculated chip offset to the second radio base station Node-B2.

In the example being illustrated in FIGS. 3A through 3C, inasmuch as the above-mentioned timing difference (Tcell2–Tcell1) is equal to –128 chips, the first radio network controller RNC1 sends the chip offset of 128 chips to the second radio base station Node-B2. Received with the chip offset from the first radio network controller RNC1, the second radio base station Node-B2 rounds the chip offset off to a value of multiples of 256 chips.

More specifically, it will be assumed that the chip offset sent from the first radio network controller RNC1 lies in a range between 0–127 chips. In this event, the second radio base station Node-B2 rounds the chip offset off to 0 chip. It will be assumed that the chip offset lies in a range between 128–256. In this event, the second radio base station Node-B2 rounds the chip offset off to 256 chips. This is because it is necessary to shift a timing at a unit of 256 chips in order to hold orthogonality between two codes (e.g. codes used in others) on the basis of the basic principles of the CDMA.

On the other hand, the mobile station MS calculates the chip offset of the HHO destination using the timing difference (Tcell2–Tcell1) sent to the first radio network controller RNC1. Under the circumstances, the mobile station MS rounds the chip offset off to 256 chips in the similar manner in the second radio base station Node-B2. Specifically, it will be assumed that the timing difference (Tcell2–Tcell1) sent to the first radio network controller RNC1 lies a range between 0–127 chips. In this event, the mobile station MS rounds the chip offset off to 0 chip. It will be assumed that the timing difference (Tcell2–Tcell1) sent to the first radio network controller RNC1 lies in a range between 128–256 chips. In this event, the mobile station MS rounds the chip offset off to 256 chips. In the example being illustrated in FIGS. 3A through 3C, inasmuch as the chip offsets after HHO are equal to each other in the second radio base station Node-B2 and the mobile station MS, the mobile station MS can normally carry out communication using the dedicated physical channel DPCH.

It will be assumed in the above-mentioned prior art that notification of the timing difference from the mobile station MS to the first radio network controller RNC1 occurs frequently for a short time interval. Under the circumstances, sent timing differences may differ from each other. In this event, it is impossible for the mobile station MS to recognize that the sent timing difference is used in the first radio network controller RNC1. Accordingly, a shift occurs in the chip offsets between the first radio network controller RNC1 (that is, also the second radio base station Node-B2) and the mobile station MS and a DPCH frame timing between the second radio base station Node-B2 and the mobile station MS may shift as shown in FIGS. 4A through 4C.

Figure 4A:
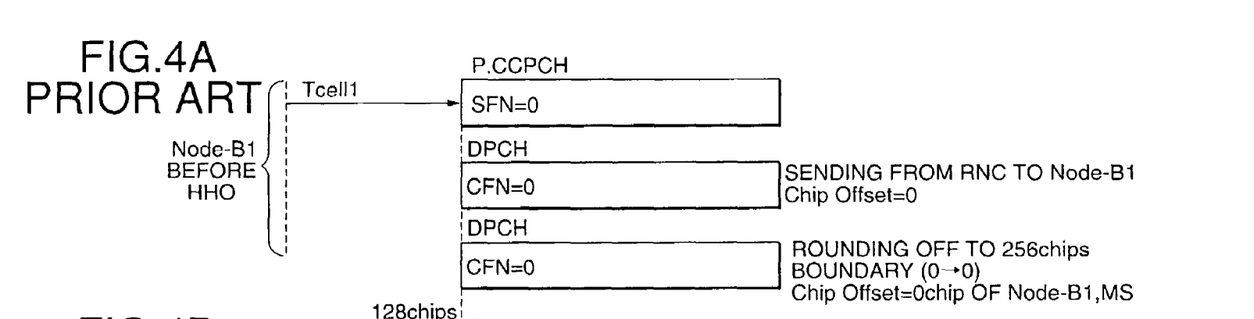
FIGS. 4A, 4B, and 4C are views for use in describing an unsuccessful example of the timing maintained hard-handover in the CDMA type mobile station.
Figures 4B, 4C:
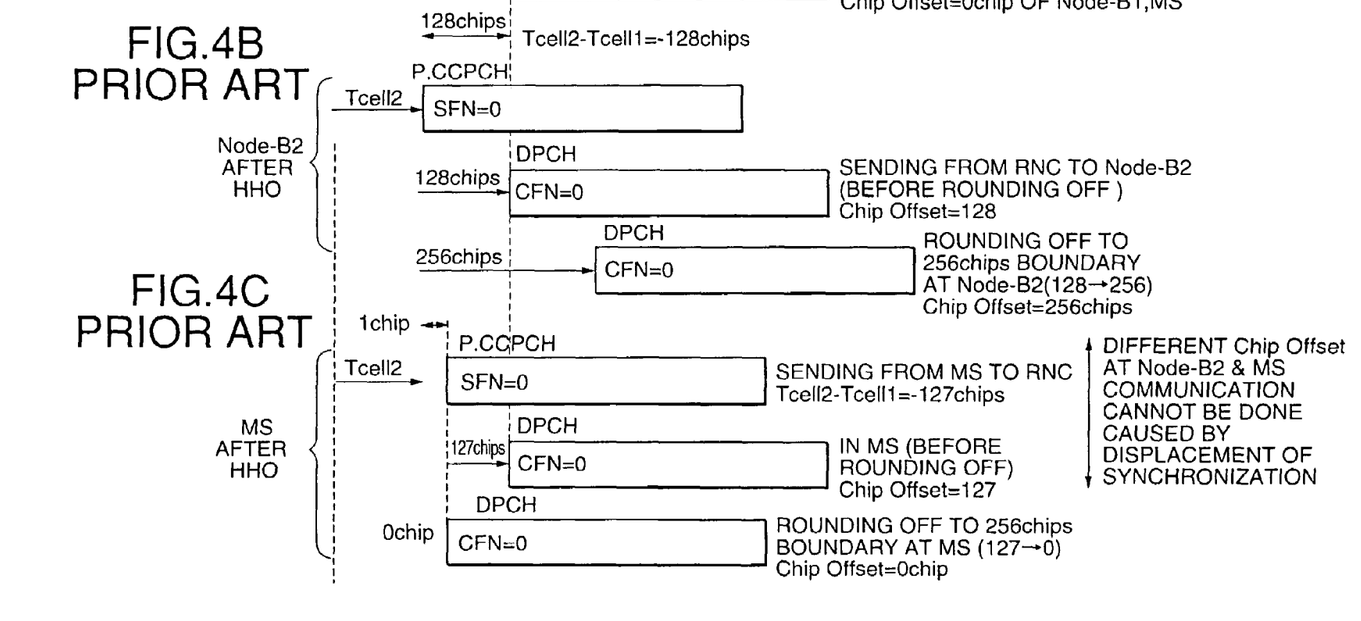

Referring to FIGS. 4A through 4C, the description will proceed to an unsuccessful example of the timing maintained HHO. FIG. 4A shows a state of the first radio base station Node-B1 before the HHO. FIG. 4B shows a state of the second radio base station Node-B2 after the HHO. FIG. 4C shows a state of the mobile station MS after the HHO.

In FIGS. 4A through 4C, it will be assumed that the mobile station MS sends a timing difference (Tcell2–Tcell1) of –128 chips to the first radio network controller RNC1 although illustration is not made in FIG. 4C. In this event, the first radio network controller RNC1 sends a chip offset of 128 chips to the second radio base station Node-B2. The second radio base station Node-B2 rounds the chip offset off to the value of the multiples of 256 chips. That is, 128 chips are rounded off to 256 chips. On the contrary, it will be assumed that the mobile station MS sends another timing difference (Tcell2–Tcell1) of –27 chips to the first radio network controller RNC1 immediately after the mobile station MS sends the timing difference (Tcell2–Tcell1) of –128 chips to the first radio network controller RNC1 as shown in FIGS. 4C. Under the circumstances, the mobile station MS rounds the chip offset of 127 chips off to 0 chip. Inasmuch as the chip offsets have different values between the second radio base station Node-B2 and the mobile station MS as shown in FIGS. 4A through 4C, it is impossible for the mobile station MS to normally carry out communication using the dedicated physical channel DPCH. That is, the HHO is unsuccessful.

Figure 5:
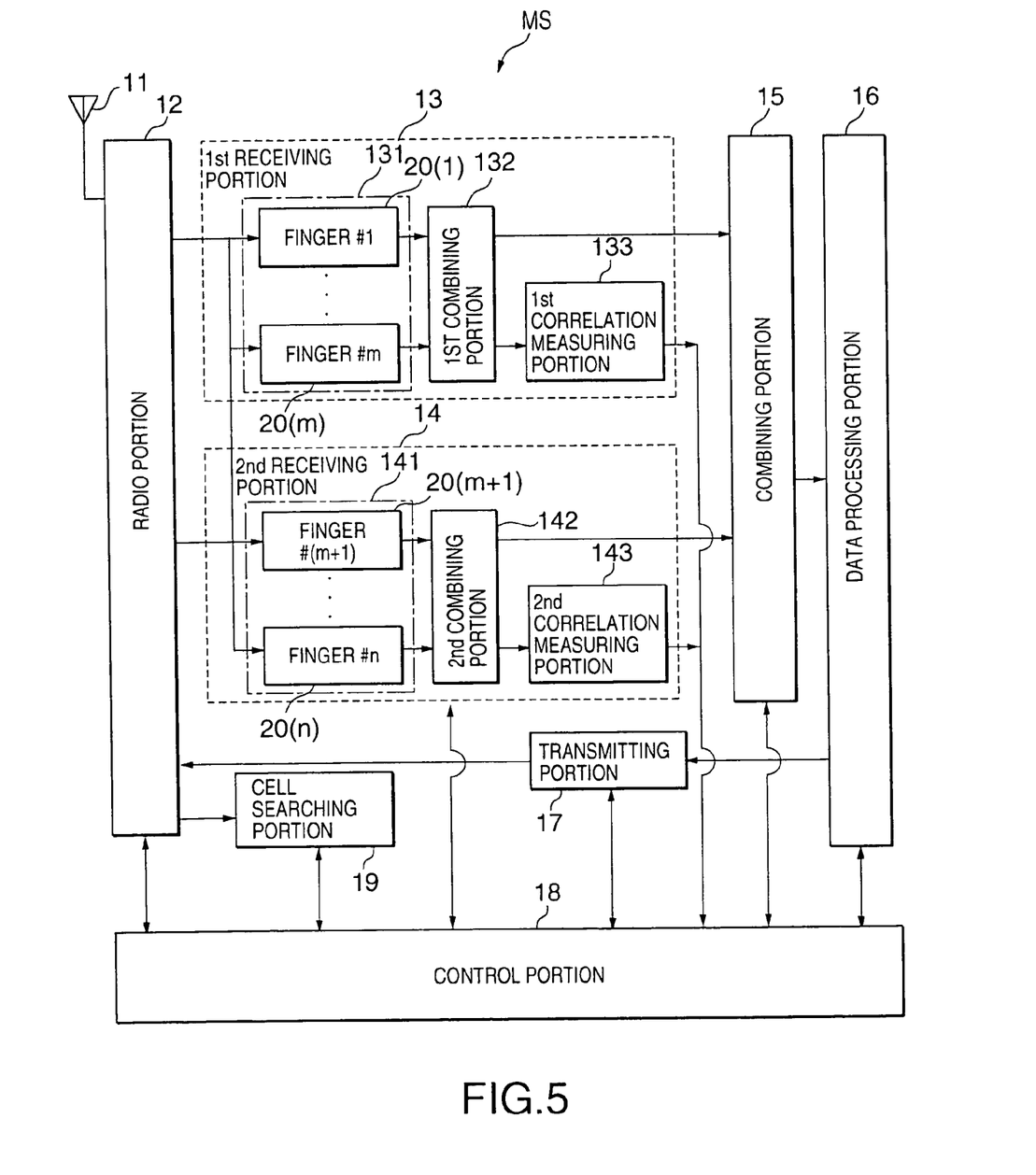
FIG. 5 shows a block diagram of a CDMA type mobile station according to an embodiment of this invention.

Referring to FIG. 5, the description will proceed to the CDMA type mobile station MS according to an embodiment of this invention. The CDMA type mobile station MS comprises an antenna 11, a radio portion 12, a first receiving portion 13, a second receiving portion 14, a combining portion 15, a data processing portion 16, a transmitting portion 17, a control portion 18, and a cell searching portion 19. The first receiving portion 13 comprises a first finger processing portion 131, a first combining portion 132, and a first correlation measuring portion 133. The first finger processing portion 131 consists of first through m-th finger circuits 20(1) to 20(m) corresponding to m channels, where m represents a first integer which is not less than one. Likewise, the second receiving portion 14 comprises a second finger processing portion 141, a second combining portion 142, and a second correlation measuring portion 143. The second finger processing portion 141 consists of (m+1)-th through n-th finger circuits 20(m+1) to 20(n corresponding to (n–m) channels, where n represents a second integer which is larger than the first integer m.

The antenna 11 receives a radio signal from radio base stations Node-B like in Node-B1 and Node-B2 shown in FIG. 1. The radio portion 12 carries out down-conversion of a frequency of a received radio signal, orthogonal demodulation of data, and an analog/digital conversion to supply the first and the second receiving portions 13 and 14 with received data having a chip rate. In addition, the radio portion 12 carries out digital/analog conversion of transmission data having the chip rate from the transmitting portion 17, orthogonal modulation of data, and up-conversion of a frequency to transmit a radio signal via the antenna 11.

Now, the description will proceed to the first receiving portion 13. Each of the first through the m-th finger circuits 20(1) to 20(m) of the first finger processing portion 131 despreads the reception data having the ship rate and carries out a phase correction to produce reception data having a symbol rate. Each of the first through the m-th finger circuits 20(1) to 20(m) is supplied from the control portion 18 with a chip offset designating DPCH reception frame timing and parameters such as the symbol rate of a despreading code or the like. The first combining portion 132 combines the reception data having the symbol rate from the first through the m-th finger circuits 20(1) to 20(m). The first combining portion 132 supplies a pilot symbol (a known data pattern) to the first correlation measuring portion 133 and supplies a data symbol to the combining portion 15. The first combining portion 132 is supplied from the control portion 18 with a format of the reception data (the symbol rate, the number of pilot symbols, the number of data symbols, and so on) and combining finger information. When the first integer m is equal to one, the first combining portion 132 is unnecessary. The first combining portion is also unnecessary when only one of the first through the m-th finger circuits 20(1) to 20(m) is used in order to carry out measurement of a correlation value. The first correlation measuring portion 133 measures the correlation value using the pilot symbol supplied from the first combining portion 132 to send a first measured result to the control portion 18. A measurement time interval for the correlation value by the first correlation measuring portion 133 is a time interval set by the control portion 18. Although the measurement time interval is arbitrarily set by the control portion 18, the measurement time interval must be at least one symbol time of DPCH (a unit time spread by CDMA).

Now, the description will proceed to the second receiving portion 14. Each of the (m+1)-th through the n-th finger circuits 20(m+1) to 20(n) of the second finger processing portion 141 despreads the reception data having the ship rate and carries out a phase correction to produce reception data having a symbol rate. Each of the (m+1)-th through the n-th finger circuits 20(m+1) to 20(n) is supplied from the control portion 18 with a chip offset designating DPCH reception frame timing and parameters such as the symbol rate of a despreading code or the like. The second combining portion 142 combines the reception data having the symbol rate from the (m+1)-th through the n-th finger circuits 20(m+1) to 20(n). The second combining portion 142 supplies a pilot symbol (a known data pattern) to the second correlation measuring portion 143 and supplies a data symbol to the combining portion 15. The second combining portion 142 is supplied from the control portion 18 with a format of the reception data (the symbol rate, the number of pilot symbols, the number of data symbols, and so on) and combining finger information. The second combining portion is unnecessary when only one of the (m+1)-th through the n-th finger circuits 20(m+1) to 20(n) is used in order to carry out measurement of a correlation value at a high speed. The second correlation measuring portion 143 measures the correlation value using the pilot symbol supplied from the second combining portion 142 to send a second measured result to the control portion 18. A measurement time interval for the correlation value by the second correlation measuring portion 143 is a time interval set by the control portion 18. Although the measurement time interval is arbitrarily set by the control portion 18, the measurement time interval must be at least one symbol time of DPCH (a unit time spread by CDMA).

The combining portion 15 combines the reception symbol supplied from the first combining portion 132 of the first receiving portion 13 with the reception symbol supplied from the second combining portion 142 of the second receiving portion 14 to supply a combined data symbol to the data processing portion 16. Although the CDMA type mobile station MS has functions such as measurement of SIR of the received signal, a transmission power control by TPC, and so, those functions are omitted because those functions are directly not related to this invention. The data processing portion 16 carries out processing of the combined data symbol. The data processing portion 16 supplies the control portion 18 with received control data (layer 3 message or the like). In addition, the data processing portion 16 supplies the transmitting portion 17 with transmission data. Furthermore, the data processing portion 16 is received from the control portion with transmission control data (layer 3 message or the like) and carries out processing of transmission/reception of user data.

On the other hand, the transmitting portion 17 carries out error correction coding of the transmission data supplied from the data processing portion 16, mapping to a physical channel, despreading to supply the transmission data to the radio portion 12. The control portion 18 controls operation of the above-mentioned portions of the CDMA type mobile station MS. More specifically, the control portion 18 sets, in the first and the second receiving portions 13 and 14, the chip offset designating the DPCH reception frame timing, the parameters such as the spreading code, the symbol rate, the number of the pilot symbol, the combining finger information, or the like.

The cell searching portion 19 carries out despreading, phase correction, and demodulation of the received data from the radio portion 12, detects or measures the PCCPCH frame timing from the radio base station, and sends it to the control portion 18. Specifically, the cell searching portion 19 measures the PCCPCH frame timing of the first radio base station Node-B1 during communication (before HHO) to send it to the control portion 18. In addition, the cell searching portion 19 measures the PCCPCH frame timing of the second radio base station Node-B2 of HHO destination (after HHO) to send it to the control portion 18.

The chip offset designating the DPCH reception timing during communication (before HHO) is called a chip offset before HHO. A timing difference between the PCCPCH frame timing of the radio base station during communication (before HHO) and the PCCPCH frame timing of the radio base station of HHO destination (after HHO) is called PCCPCH frame timing difference. The chip offset designating the DPCH reception frame timing of HHO destination (after HHO) is called a chip offset after HHO. On HHO, the control portion 18 calculates the chip offset after HHO using the chip offset before HHO and the PCCPCH frame timing difference supplied from the cell searching portion 19. That is:

the chip offset after HHO=the chip offset before HHO-the PCCPCH frame timing difference.

Figure 6:
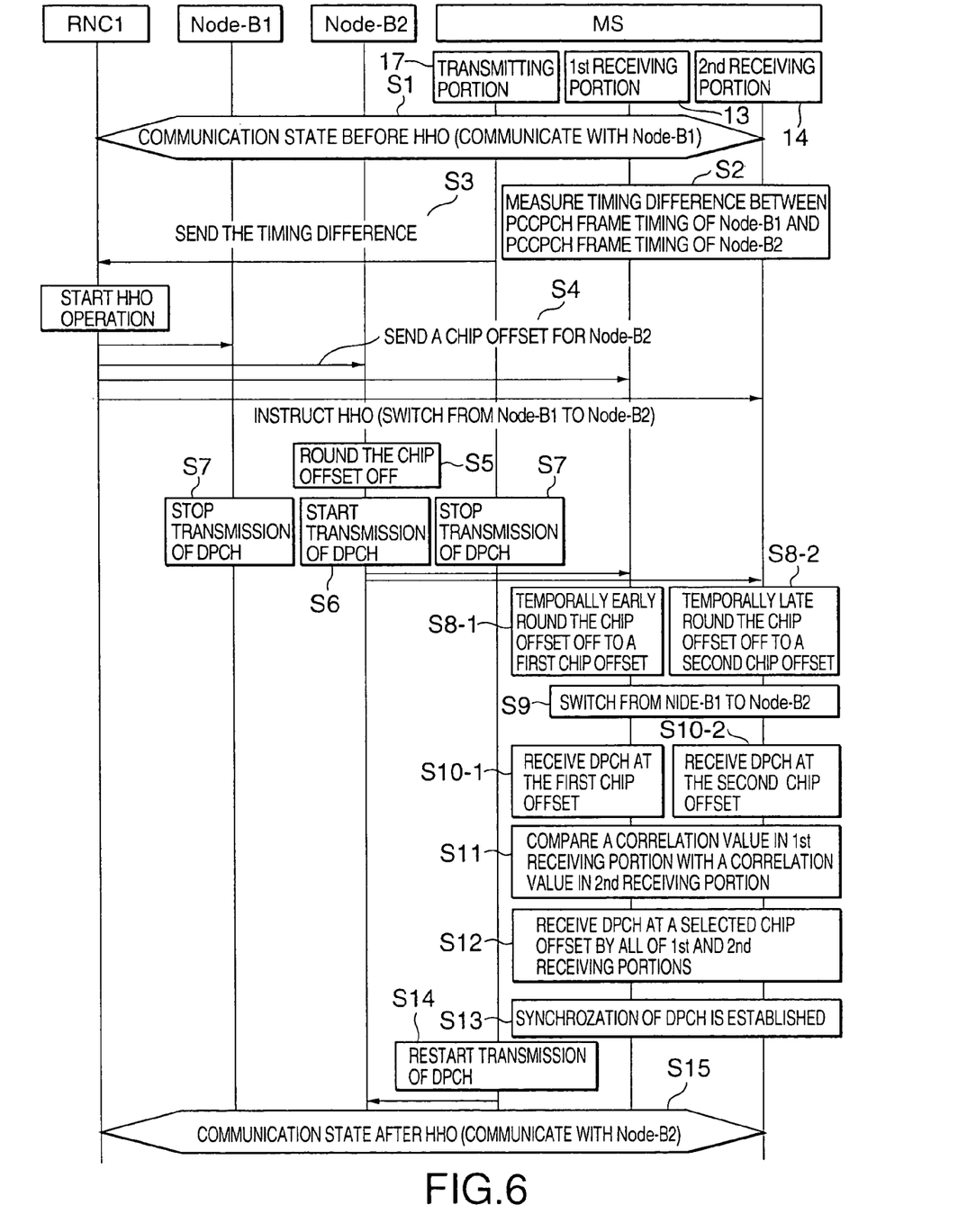
FIG. 6 is a sequence diagram for use in describing operation of an inter-frequency hard-handover in this invention.

Referring now to FIG. 6, description will be made as regards peculiar operation of the CDMA type mobile station MS illustrated in FIG. 1. FIG. 6 is a sequence diagram showing operation of the inter-frequency timing maintained HHO according to this invention. While the CDMA type mobile station MS communicates with the first radio base station Node-B1 (before HHO) at a step S1, the CDMA type mobile station MS measures the timing difference between the PCCPCH frame timing of the first radio base station Node-B1 and the PCCPCH frame timing of the second radio base station Node-B2 of HHO destination (step S2) and sends the timing difference to the first radio network controller RNC1 (step S3). When the first radio network controller RNC1 carries out HHO from the first radio base station Node-B1 to the second radio base station Node-B2, the first radio network controller RNC1 sends that effect to the first radio base station Node-B1, the second radio base station Node-B2, and the CDMA type mobile station MS. In this event, the first radio network controller RNC1 sends a chip offset to the second radio base station Node-B2 on the basis of the timing difference send from the CDMA type mobile station MS so that a transmission timing of the CDMA type mobile station MS does not change caused by HHO (step S4).

Although the first radio network controller RNC1 decides whether or not it carries out the HHO on the basis of information such as a reception level sent from the CDMA type mobile station MS, the description is omitted because it is not directly related to this invention. The second radio base station Node-B2 rounds the chip off sent from the first radio network controller RNC1 off to a value of multiple of 256 chips (step S5) and starts transmission of the dedicated physical channel DPCH (step S6). On the other hand, received with instruction of the HHO, the CDMA type mobile station MS stops transmission of the dedicated physical channel DPCH and enters switching operation of a frequency (from the first radio base station Node-B1 to the second radio base station Node-B2) (step S7). The first radio base station Node-B1 stops transmission of the dedicated physical channel DPCH (step S7). The CDMA type mobile station MS calculates the chip offset for the second radio base station Node-B2 and rounds it off to the value of multiple of 256 chips so that the transmission timing of the CDMA type mobile station MS does not change (step S8).

In the CDMA type mobile station MS according to this invention, a receiving portion is divided into the first receiving portion 13 and the second receiving portion 14 in the manner which is described above. The first receiving portion 13 temporally early rounds the chip offset off to a first chip offset (step S8-1) while the second receiving portion 14 temporally late rounds the chip offset off to a second chip offset (step S8-2). Specifically, in prior art, the chip offset is rounded to 0 chip when the PCCPCH timing difference lies in a range between 0–127 chips and the chip offset is rounded to 256 chips when the PCCPCH timing difference lies in a range between 128–256 chips. However, in the CDMA type mobile station MS according to this invention, although the timing difference is equal to 127 chips, the first chip offset of the first receiving portion 13 is rounded from 127 chips to 0 chip and the second chip offset of the second receiving portion 14 is rounded from 127 chips to 256 chips, and respective DPCH receptions are carried out.

The first receiving portion 13 and the second receiving portion 14 carry out the reception of the dedicated physical channel DPCH for a predetermined time interval, and the first and the second correlation measuring portions 133 and 143 measure the correlated value steps S10-1 and S10-2). Although the measurement time interval may be arbitrarily set, the measurement time interval must have at least one symbol time interval (a unit time spread by CDMA). On the basis of the measured results of the correlation values, the control portion 18 selects the chip offset having a larger correlation value used in the first receiving portion 13 or the second receiving portion 14 (step S11) and thereafter the CDMA type mobile station MS carries out reception of the dedicated physical channel DPCH using the selected chip offset by all of the first and the second receiving portions 13 and 14 (step S12). Subsequently, synchronization of the dedicated physical channel DPCH is established (step S13), the transmitting portion 17 restarts transmission of the dedicated physical channel DPCH (step S14), and the CDMA type mobile station MS starts communication with the second radio base station Node-B2 or the HHO is complicated (step S15). Although measurement of a correlated value of the dedicated physical channel DPCH and decision of synchronization establishment are carried out using a pilot symbol in the dedicated physical channel DPCH (known data pattern), this description is omitted because it is not related to this invention.

Figures 7A, 7B:
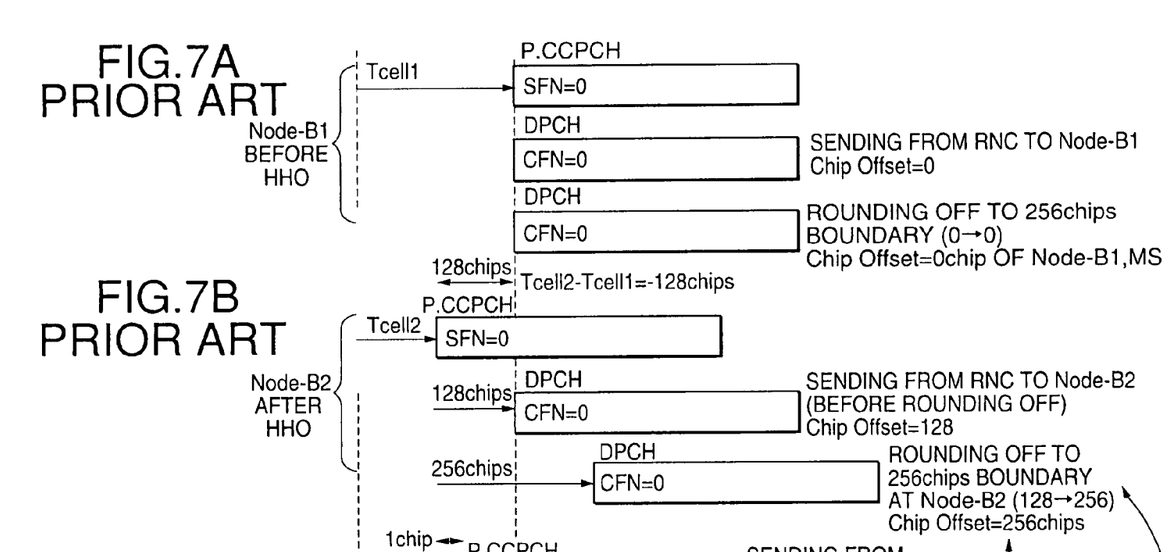
FIGS. 7A, 7B, and 7C are views for use in describing an example of the timing maintained hard-handover in this invention.
Figure 7C:
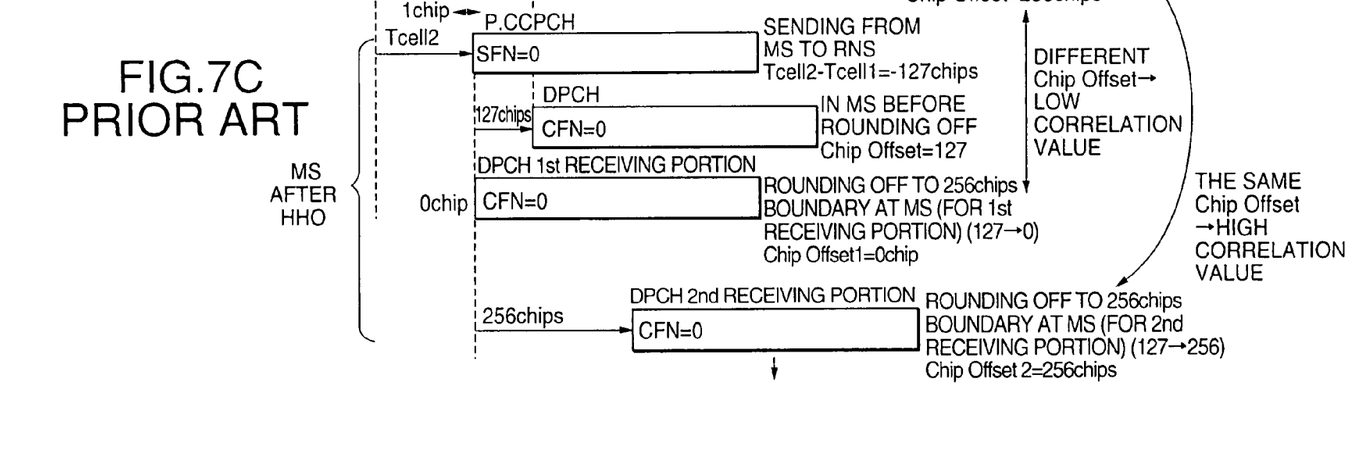

Referring now to FIGS. 7A, 7B, and 7C, the description will proceed to operational example of the inter-frequency timing maintained HHO according to this invention. FIGS. 7A through 7C illustrate a case where the PCCPCH frame timing difference (Tcell2−Tcell1) sent from the CDMA type mobile station MS to the first radio network controller RNC1 successively takes −128 chips and −127 chips. On staring of HHO, the first radio network controller RNC1 sends the chip offset of 128 chips to the second radio base station Node-B2. The second radio base station Node-B2 rounds the chip offset of 128 chips off to 256 chips and starts transmission of the dedicated physical channel DPCH. On the other hand, the CDMA mobile station MS internally recognizes that the chip offset is 127 chips on starting of the hard handover. The CDMA mobile station MS rounds the first chip offset of 127 chips in the first receiving portion 13 off to 0 chip, rounds the second chip offset of 127 chips in the second receiving portion 14 off to 256 chips, and starts reception of the dedicated physical channel DPCH. As a result, the first receiving portion 13 has a low correlation value because the chip offset in the first receiving portion 13 is different from that in the second radio base station Node-B2 and the second receiving portion 14 has a high correlation value because the chip offset in the second receiving portion 14 is equal to that of the second radio base station Node-B2. In response to a compared result of both, the CDMA type mobile station MS continues communication with the chip offset in all of the receiving portions 13 and 14 set 256 chips.

Figure 8A:
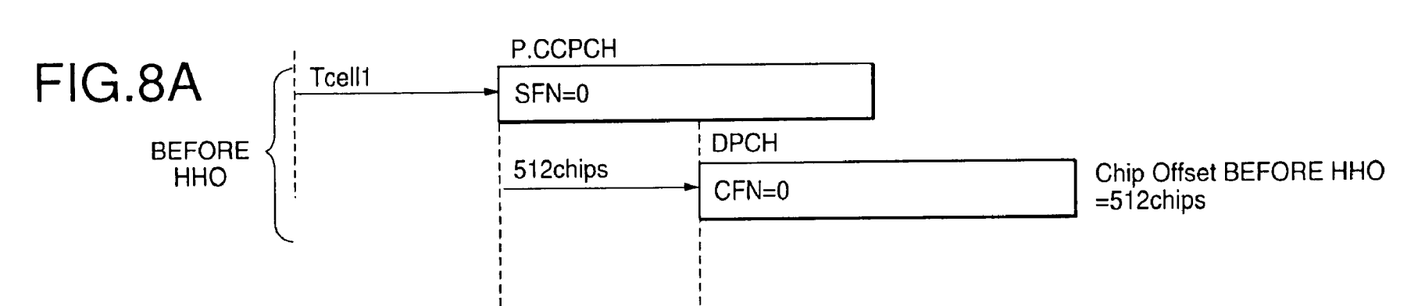
FIGS. 8A, 8B, and 8C are views for use in describing calculation of a DPCH chip offset of a hard-handover destination in this invention.
Figure 8B:
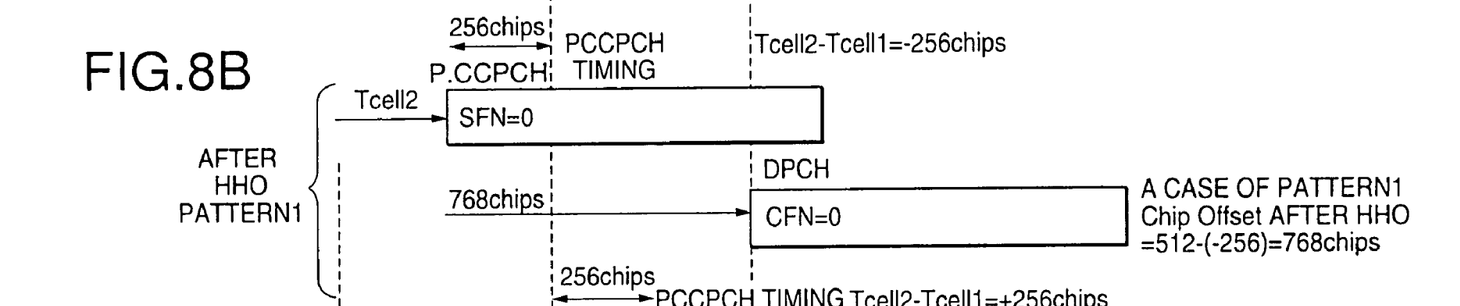
Figure 8C:
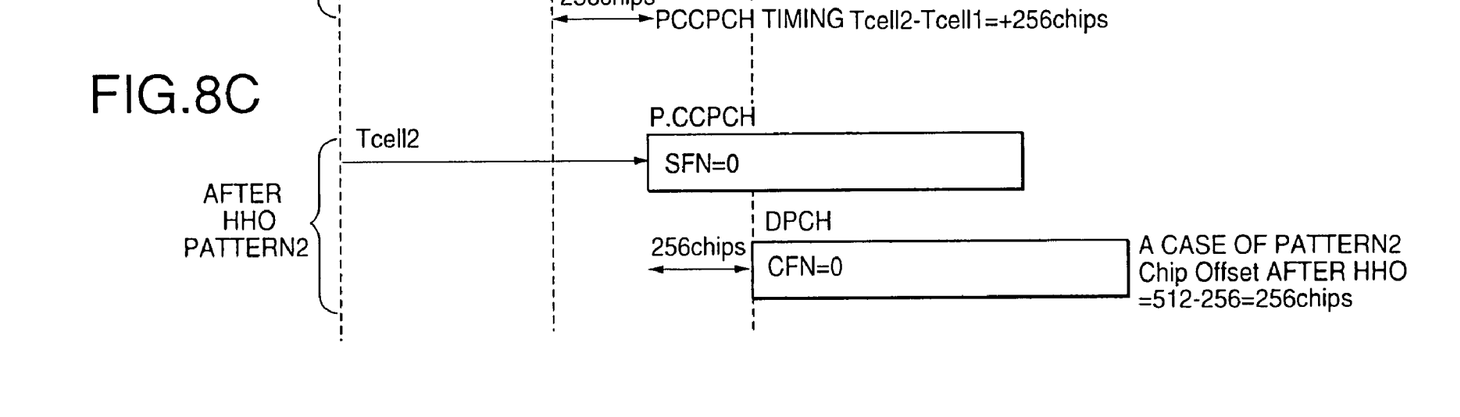

Referring now to FIGS. 8A, 8B, and 8C, the description will proceed to computational examples of the chip offset after HHO. Although the chip offset has the value of multiple of 256 chips in FIGS. 8A through 8C in order to simplify the description, a friction of the chip offset is originally rounded off to the value of multiple of 256 chips. Although the chip offset after HHO is rounded off to the value of multiple of 256 chips in the manner which is described above (see FIGS. 7A through 7C), the first chip offset rounded off temporally earlier is set in the first receiving portion 13 and the second chip offset rounded off temporally later is set in the second receiving portion 14. It is assumed that the chip offset after HHO is equal to 127 chips. In this event, the first chip offset=127 chips→$o$ chip, the second chip offset=127 chips→256 chips.

The control portion 18 sets the correlation measurement time in the first correlation measuring portion 133 and the second correlation measuring portion 143. Although the correlation measurement time may arbitrarily set, the correlation measurement time has at least one symbol time interval of the dedicated physical channel DPCH (a unit time spread by CDMA). The control portion 18 receives measured results of correlated values from the first correlation measuring portion 133 and the second correlation measuring portion 143, compares both, selects the chip offset having a large correlated value used in the first receiving portion 13 or the second receiving portion 14, and sets the selected chip offset in all of the receiving portions 13 and 14.

It is possible for the combining portion 15 to set one of combining of the received data symbols from the first receiving portion 13 and the second receiving portion 14, selection of either one of the received data symbols without combining, and no selection. The control portion 18 transmits/receives control data (layer 3 message or the like) to/from the data processing portion 16. The control portion 18 sets channel setting parameters (the spreading code, the symbol rate of the transmission user data, and so on), parameters for cording, and so on in the transmitting portion 13. The cell searching portion 19 carries out despreaing, phase correction, and demodulation of the received data supplied from the radio portion 12, detects the PCCPCH frame timing supplied from the radio base station Node-B, and sends it to the control portion 18. Specifically, prior to HHO, the cell searching portion 19 measures the PCCPCH frame timing of the first radio base station Node-B1 during communication (before HHO) and the PCCPCH frame timing of the second radio base station Node-B2 for HHO destination (before HHO) to send them to the control portion 18.

While this invention has thus far been described in conjunction with an embodiment thereof, it will readily be possible for those skilled in the art to put this invention into practice in various other manners.

What is claimed is:

1. A code division multiple access (CDMA) type mobile station comprising:
   a radio portion for modulating a radio signal to produce a received signal and for demodulating a transmission signal into said radio signal;
   a receiving portion for despreading said received signal to produce received data;
   a transmitting portion for spreading transmission data to produce said transmission signal;
   a data processing portion for processing said received data and said transmission data; and
   a control portion for controlling operation of said radio portion, said receiving portion, said transmitting portion, and said data processing portion,
   said receiving portion comprising:
   a first receiving portion for receiving said received signal at a first chip offset to which a chip offset is temporally early rounded off to produce a first received data symbol; and
   a second receiving portion for receiving said received signal at a second chip offset to which the chip offset is temporally late rounded off to produce a second received data symbol,
   said CDMA type mobile station further comprising a combining portion, disposed between said receiving portion and said data processing portion, for combining the first received data symbol with the second data symbol to supply a combined data symbol to said data processing portion.

2. A CDMA type mobile station as claimed in claim 1, wherein each of said first and said second receiving portions comprises:
   a finger processing portion for despreading and phase correcting said received signal to produce the received data having a symbol rate; and
   a correlation measuring portion for measuring a correlation value using a pilot symbol.

3. A CDMA type mobile station as claimed in claim 2, wherein said finger processing portion comprises a plurality of finger circuits, each of said first and said second receiving portions further comprising a combining portion for combining the received data from said plurality of finger circuits.

4. A CDMA type mobile station as claimed in claim 1, wherein further comprises a cell searching portion for carrying out despreading, phase-correction, and demodulation of said received signal to detect a frame timing of a primary common control channel from each of radio base stations, said cell searching portion sending the frame timing to said control portion.

5. A hard-handover method for use in a code division multiple access (CDMA) system comprising a mobile station, first and second radio base stations, and a radio network controller connected to said first and said second radio base stations, said hard-handover method carrying out hard-handover operation in which, with a movement of said mobile station, said mobile station moves between cells by changing a radio base station communicated with the mobile station from said first base station to said second base station, said hard-handover method comprising the steps of:
   measuring, in said mobile station, a timing difference between a primary common control channel frame timing of said first radio base station and a primary common control common control channel frame timing of said second radio base station;

sending the timing difference from said mobile station to said radio network controller;

sending a chip offset from said radio network controller to said second radio base station;

rounding, in said second radio base station, the chip offset off;

starting, in said second radio base station, transmission of a dedicated physical channel;

stopping, in said mobile station and said first radio base station, transmission of the dedicated physical channel;

temporally early rounding, in said mobile station, the chip offset off to a first chip offset;

temporally late rounding, in said mobile station, the chip offset off to a second chip offset;

receiving, in said mobile station, said dedicated physical channel at said first chip offset to produce first received data;

receiving, in said mobile station, said dedicated physical channel at said second chip offset to produce second received data;

measuring, in said mobile station, a first correlation value of said first received data;

measuring, in said mobile station, a second correlation value of said second received data;

selecting, in said mobile station, as a selected chip offset, one of said first and said second chip offsets that has a larger one of said first and said second correlation values; and receiving, in said mobile station, said dedicated physical channel at said selected chip offset.

6. A hard-handover method of a mobile station in a code division multiple access (CDMA) communication system, comprising the steps of:

calculating a reception timing of a handover destination on the basis of a timing difference between a primary common control channel sent from a first radio base station of a handover source and a primary common control channel sent from a second radio base station of the handover destination;

rounding said reception timing of the handover destination off to first and second reception timings, the first reception timing being earlier than the second reception timing;

simultaneously carrying out date reception of a received signal using the first and the second reception timings to produce first and second received data:

carrying out correlation decision of said first and said second received data to produce first and second correlation values; and receiving said received signal using a selected one of the first and the second reception timings that has a larger one of the first and the second correlation values.

* * * * *